United States Patent [19]

Muhr et al.

[11] 4,195,884

[45] Apr. 1, 1980

[54] HINGE FOR A RECLINABLE BACK OF A MOTOR VEHICLE SEAT

[75] Inventors: Dieter Muhr; Heinz P. Cremer, both of Remscheid, Fed. Rep. of Germany

[73] Assignee: Keiper Automobiltechnik GmbH & Co. KG, Remscheid, Fed. Rep. of Germany

[21] Appl. No.: 910,502

[22] Filed: May 30, 1978

[30] Foreign Application Priority Data

Jun. 1, 1977 [DE] Fed. Rep. of Germany ....... 2724637

[51] Int. Cl.² ............................................. A47C 1/025
[52] U.S. Cl. ..................................... 297/362; 297/355
[58] Field of Search ............... 297/362, 361, 373, 374, 297/367–371, 355, 354; 16/139, 140, 143

[56] References Cited

U.S. PATENT DOCUMENTS

| | | | |
|---|---|---|---|
| 3,401,979 | 9/1968 | Putsch | 297/362 |
| 4,020,717 | 5/1977 | Johnson | 297/362 X |
| 4,025,109 | 5/1977 | Klingelhöfer et al. | 297/362 X |

*Primary Examiner*—William E. Lyddane
*Attorney, Agent, or Firm*—Michael J. Striker

[57] ABSTRACT

The hinge for a reclinable backrest of a motor vehicle seat includes two symmetrically bifurcated hinge parts. The first hinge part is connected to an external gear annulus and the second hinge part to an internal gear annulus engaging a part of the teeth of the external gear annulus. An eccentric bolt is rotatable about a pivot axis and has an eccentric control zone supported for rotation in the center bore of the external gear annulus and in the corresponding bores of the first hinge part. The second hinge portion is supported for rotation on the zones of the bolt which are concentric with the pivot axis.

16 Claims, 3 Drawing Figures

HINGE FOR A RECLINABLE BACK OF A MOTOR VEHICLE SEAT

BACKGROUND OF THE INVENTION

The present invention relates to a hinge for use in a seat in general, and particularly in a motor vehicle seat, in which a back component is to be mounted on a seat component of the seat for angular adjustment relative thereto.

Hinges of this type and for use in this environment for the above-mentioned purpose are already known and in widespread use. Usually, they include respective hinge elements which are connected to the seat and back components of the seat and which are connected to one another for angular displacement relative to each other by means of a pivot. In one conventional hinge of this type, there is provided an arrangement for determining and adjusting the relative position of the hinge elements with respect to one another, which includes an internal gear annulus rigid with one of the hinge elements and an external gear annulus which is rigid with the other of the hinge elements and meshes with the internal gear annulus. In this conventional hinge, the diameter of the crest circle of the external gear annulus is smaller by at least one tooth height than the root diameter of the internal gear annulus. The eccentricity of the eccentric portion of the pivot on which one of the two hinge elements is mounted substantially corresponds to the difference between the radius of the root circle of the internal gear annulus and the radius of the crest circle of the external gear annulus.

A conventional hinge of this particular type is disclosed, for instance, in the German patent DT-PS 1 297 496, wherein the internal gear annulus is rigid with the hinge element which is to be affixed to the seat component of the seat, and the external gear annulus is provided on an external gear member which is rigid with the gear element that is to be connected to the back component of the seat, and meshes with the internal gear annulus. In this hinge, the external gear is pivotally mounted on an eccentric bolt which constitutes the pivot of the hinge, while the hinge element which has the internal gear annulus that meshes with the external gear annulus thereon is rotatably supported on a portion of the eccentric bolt which is centered on a pivot axis. As a result of the above-mentioned selection of the dimensions of the external and internal gear annuli, on the one hand, and of the smallest possible eccentricity of the eccentric portion of the eccentric bolt with respect to the portion which is centered on the pivot axis, which results therefrom, on the other hand, there is obtained a safe self-locking action between the internal and the external gear annulus so that there is obtained, on the one hand, the possibility to continuously and steplessly adjust the angular position of the back component relative to the seat component of the seat by rotating an actuating handle or the like while, on the other hand, any displacement of the hinge elements relative to one another as a result of forces acting on the back component of the seat is avoided. The actuating handle or element is connected to the eccentric bolt for rotation therewith so that, when the actuating element is rotated about the pivot axis of the eccentric bolt, thus turning the eccentric bolt about its pivot axis, the eccentric axis of the eccentric portion of the bolt will orbit about the pivot axis of the bolt. As a result of this, the internal and external gear annuli which mesh with one another and which have different numbers of teeth will cause angular displacement of the hinge element connected to the back component of the seat relative to the hinge element connected to the seat component of the seat.

This hinge construction is very simple and inexpensive, and performs to satisfaction, under most circumstances, over a substantial period of time. However, experience with this type of a hinge has also shown that, as a result of the fact that the hinge elements are located side-by-side at a distance from one another which corresponds to the width of the teeth of the internal and external gear annuli, it is impossible to keep the teeth of the external and internal gear annulus free from positive forces resulting from a support moment. These positive forces influence the self-locking feature and result, augmented by the play between the flanks of the teeth caused by manufacturing tolerances, in a considerable wear of the teeth of the internal and external gear. In order to avoid premature deterioration of the teeth of the internal and external gear annuli, it is therefore necessary to maintain the wear of the teeth within acceptable limits by properly selecting the materials of the parts which are formed with the external and internal gears. In other words, it is necessary to employ rather expensive materials which have a high resistance to wear for the respective parts, which results in a substantial cost of these parts and thus even of the entire hinge.

Another hinge of this type has been revealed in the German published patent application DT-AS 1 580 543 in which the internal gear annulus is provided on a gear member which, in order to compensate for the play resulting from manufacturing tolerances, is mounted, by means of a bearing plate which is rigidly connected to the internal gear annulus, on an eccentric ring of an elastic material, which eccentric ring is, in turn, rotatably supported on a pivot axle which is affixed to the gear member which has the external gear annulus and to which a handle is connected for joint rotation by means of connecting elements. Even though the fact that the eccentric ring is made of an elastic material results in a situation where any play between the teeth of the internal and external gears is compensated for, it is still impossible to keep the teeth of the external and internal annuli free from the positive forces resulting from the support moment inasmuch as, on the one hand, the hinge elements are located with spacing adjacent one another and, on the other hand, the bearing portion which supports the eccentric ring is also located assymmetrically next to the internal and external gear annuli. This, of course, is very disadvantageous inasmuch as it results in a rapid and premature deterioration of the teeth of the gear annuli.

SUMMARY OF THE INVENTION

Accordingly, it is a general object of the present invention to avoid the disadvantages of the prior art.

More particularly, it is an object of the present invention to provide a hinge for adjustably mounting a back component on a seat component of a seat which is not possessed of the disadvantages of the hinges of this type.

A further object of the present invention is to so construct the hinge that the hinge elements thereof are so supported on one another that no support moments will become active between the hinge elements.

An additional element of the present invention is to so construct the angularly adjusting arrangement of the hinge as to remain free from positive forces.

A concomitant object of the present invention is to develop a hinge of the type here under consideration which is simple in construction, inexpensive to manufacture, and reliable in operation nevertheless.

In pursuance of these objects and others which will become apparent hereafter, one feature of the present invention resides in a hinge for use in a seat, particularly in a motor vehicle seat, for mounting a back component on a seat component of the seat for angular adjustment relative thereto, which comprises, briefly stated, in combination, a pivot element having a first plurality of cylindrical zones centered on a pivot axis and a second plurality of cylindrical zones centered on an eccentric axis parallel to and offset from the pivot axis; a first hinge element mounted on one of the pluralities of zones and having a first gear portion and a first bifurcated portion which is rigid with and partially embraces the first gear portion; a second hinge element mounted on the other of the pluralities of zones and including a second gear portion meshing with the first gear portion, and a second bifurcated portion which is rigid with the second gear portion and partially embraces the same and the first bifurcated portion; and means for turning the pivot element about the pivot axis to thereby displace the hinge elements relative to one another with the gear portions in mesh. Advantageously, the first gear portion is an external gear annulus, and the second gear portion is an internal gear annulus having a crest circle diameter larger by at least one tooth height than the root circle diameter of the first gear annulus. Then, the eccentric axis is advantageously offset from the pivot axis by a distance substantially corresponding to the difference between the radius of the root circle of the internal gear annulus and the radius of the crest circle of the external gear annulus. An especially advantageous embodiment of the present invention is obtained when the first bifurcated portion includes a first pair of support members which partially confine the first gear portion between themselves, and when the second bifurcated portion includes a second pair of supporting members which partially confine the second gear portion and the first support members between themselves, Then, it is particularly advantageous when the first and second support members are configurated as first and second complementary shell halves, respectively.

A further facet of the present invention resides in the provision of the first gear portion as a discrete gear member which has an external gear annulus, which is affixed to the first shell halves, and which is mounted on one of the zones of the second plurality, the second gear portion including an internal gear annulus affixed to the second shell halves which mount the internal gear annulus on respective ones of the above-mentioned zones of the first plurality which are located to axially opposite sides of, and axially adjacent the above-mentioned one zone of the second plurality.

As a result of the separation of the hinge elements in mutually symmetrically arranged shell halves, it is achieved that, despite the fact that the support forces are split into two partial forces of equal magnitude, these partial forces become active as resulting forces in the center of the meshing plane of the internal and external gear annuli. Positive forces resulting from eccentrically active support forces which could generate, at their respective moment arms, support moments and could deleteriously act on the internal and external gear annuli, are no longer encountered as a result of this construction. As a result of the use of the pivot element whose eccentric portion or zones is arranged centrally between two pivot portions or zones which are centered on the pivot axis, it is also possible to reduce the bending stresses acting on the pivot element and thus obtain more advantageous dimensions of the pivot element.

In order to obtain a sufficiently large adjustment range of the rear component of the seat, on the one hand, and to reduce the friction in the bearings by a corresponding choice of the material of the bearing, it is proposed according to a further feature of the present invention that the second shell halves have substantially semi-circular configurations and are provided with centrally situated support eyelets, and that bearing sleeves be received in the support eyelets to mount the respective zones of the first plurality therein. A coordination of the adjustment range to the requirements, or an increase in the adjustment range, can be advantageously obtained in that the first shell halves have first and second abutment surfaces, respectively, the first abutment surfaces being located closer to one another than the second abutment surfaces as considered in the direction of displacement of the hinge elements relative to one another. The first abutment surfaces are advantageously located in recesses of the first shell halves. Such a distribution of the abutment surfaces permits the hinge elements to be displaced with respect to each other within a limited range before respective ones of the first and second abutment surfaces abut each other.

In order to achieve an uncomplemental and positive transmission of the adjustment and holding forces between the first portion which is constructed as a discrete gear member having external teeth and the first shell halves and vice versa, there is provided means for connecting the gear member to the first shell halves which includes at least one axial projection on at least one of the gear member and first shell halves, and at least one axial recess in at least another of the first shell halves and gear member and receiving the axial projection. Particularly good results are obtained when the connecting means includes a plurality of axial projections located on axial faces of the gear member, and a plurality of axial holes in the shell halves which respectively receive the axial projections of the gear member, the plurality of axial projections including at least two of the axial projections on each of the axial faces of the gear member, and the plurality of axial holes including at least two of the axial holes in each of the first shell halves. According to a further facet of the present invention, there is provided, for a safe transmission of forces between the members of the second hinge element, means for connecting the second shell halves, including attaching eyelets at the periphery of the internal gear annulus of the second hinge element, and attaching members accommodated in the attaching eyelets and connected to the second shell halves.

In order to make the hinge adaptable to different constructions of the seat which require mounting plates of different dimensions, it is proposed, in accordance with a further aspect of the present invention, that the first and second shell halves terminate radially outwardly adjacent the periphery of the second gear portion, and that each of the first and second hinge elements further includes a mounting member adapted to be connected to one of the components of the seat and rigidly connected to the first and second shell halves, respectively. The mounting members can be connected to the respective first and second shell halves by welding, by means of screws or rivets, or in any similar manner. While it is advantageous for the welding of the mounting members to the respective shell halves to bring the respective shell halves together adjacent the outer periphery of the internal gear annulus, it is advantageous, particularly for the connection by means of screws or rivets, to provide the first and second shell sections with connecting portions which extend radially outwardly beyond the periphery of the second gear portion, and to accommodate the respective one of the mounting members between the connecting portions of the respective ones of the first and second shell halves. Then, it is particularly advantageous when the first and second shell halves, which have respective main portions which extend along respective general planes, have their end portions respectively offset in the axial direction from the respective general planes.

In order to achieve a foolproof assembly of the gear member which has the external gear annulus thereon with the first shell halves which are to be connected thereto, and also to simplify the storage of the parts which are needed for the assembly of a respective hinge, it is further proposed according to an additional aspect of the present invention to make the number of the axial holes in each of the first shell halves at least twice larger than the number of the axial projections on the corresponding axial face of the gear member having the external gear annulus thereon, the axial projections of each of the axial faces of the gear member being located and uniformly angularly distributed on a circle, and the axial holes of each of the first shell halves being located and uniformly distributed along the same circle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
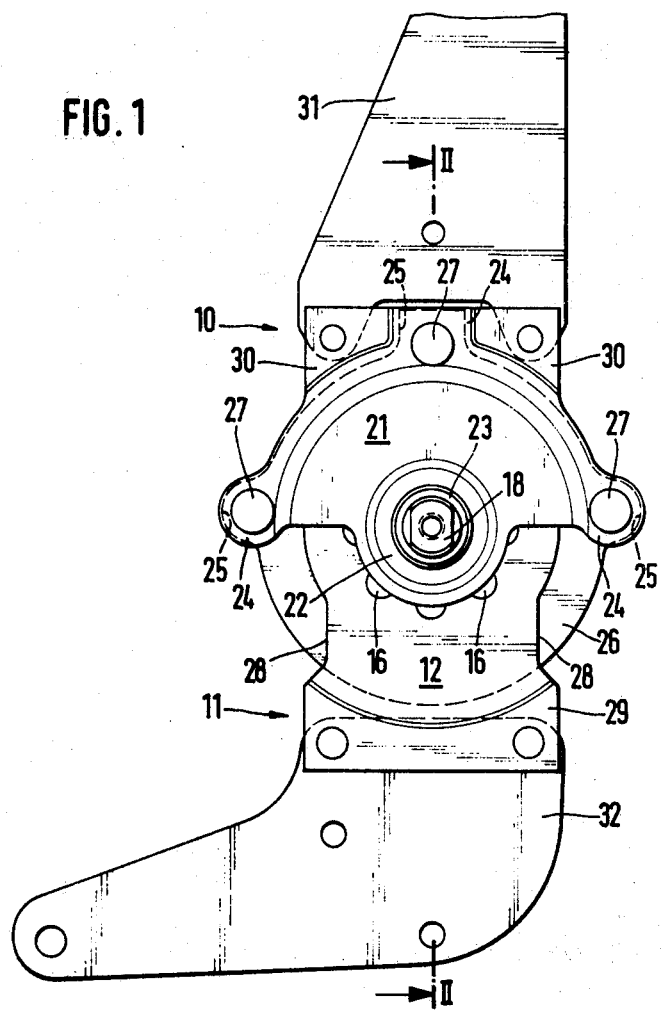
FIG. 1 is a side elevational view of an exemplary embodiment of a hinge according to the present invention.
Figure 2:
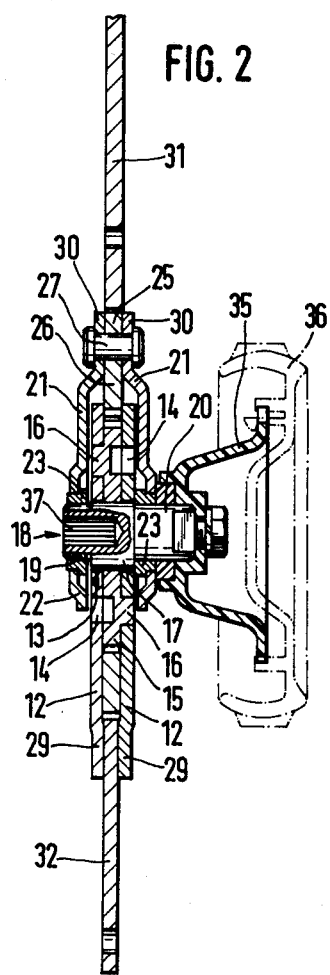
FIG. 2 is a sectional view taken on line II—II of FIG. 1.

Referring now to the drawing in detail, and first to FIG. 1 thereof, it may be seen that it illustrates a hinge which includes a hinge element 10 which is to be connected, for instance, to a non-illustrated back component of an adjustable seat, and a hinge element 11 which is to be connected, for instance, to a seat component of the seat, which has also not been illustrated. The hinge element 11, as best seen in FIG. 2, includes two shell halves 12 which are arranged at a distance from one another so as to bound an interspace between one another, each of the shell halves 12 having a central bore 13. A plurality of, in the illustrated exemplary embodiment eight, bores 14 which are axially parallel to and spaced from the central bore 13, are distributed along a distribution circle at equal spacings from one another. Four pins 16 provided at each axial face of an external gear 15, are received in the respective bores 14 and make the external gear 15 rigid with the respective shell half 12, at least in the radial plane of the external gear 15. The external gear 15 is provided with an axial bore 13' which has a center axis parallel to and equidistant from the axes of the pins 16, the diameter of the bore being somewhat smaller than the diameter of the central bores 13 in the shell halves 12. The bore 13' of the external gear 15 receives an eccentric portion 17 of a pivot 18 which constitutes the pivot axle of the hinge.

The pivot or eccentric bolt 18 is provided, at the two sides of its eccentric portion 17, with cylindrical portions 19 and 20 which are centered on a pivot axis which is offset from the axis of the eccentric portion 17. Additional shell halves 21 which partially constitute the hinge element 10 that is to be connected to the back component of the seat are supported for rotation on the cylindrical portions 19 and 20, being provided with eyelets 22 and with bearing sleeves 23 received therein. The additional shell halves 21 are of semi-circular configurations and are connected, for instance, by rivets 27, at three connecting locations 24 with attaching eyelets 25 of an internal gear 26 which surrounds the external gear 15. In the illustrated embodiment of the present invention, the number of teeth of the external gear 15 is smaller by one than the number of teeth of the internal gear 26. As a result of this, there is obtained a diameter of the crest circle of the external gear 15 which is smaller by one tooth height than the diameter of the root circle of the inner gear 26. The axis of the eccentric portion 17 is offset from the pivot axis of the cylindrical portions 19 and 20 by a distance which is so selected as to correspond to the difference between the radius of the root circle of the internal gear 26 and the radius of the crest circle of the external gear 15.

The shell halves 12 which are connected with the external gear 15 are confined, in their upper region as illustrated in the drawing, by the additional shell halves 21 which have arcuate configurations. The connecting locations 24 of these additional shell halves 21 which are outermost and which are located opposite one another, limit the relative angular displacement between the hinge elements 10 and 11 in that the connecting locations 24 abut the substantially parallel lateral surfaces of the shell halves 12. In order to obtain a sufficient range of adjusting displacement of the hinge element 10 with respect to the hinge element 11, the shell halves 12 are provided, at their substantially parallel lateral surfaces and in the abutment region, with recesses or depressions 28.

Figure 3:
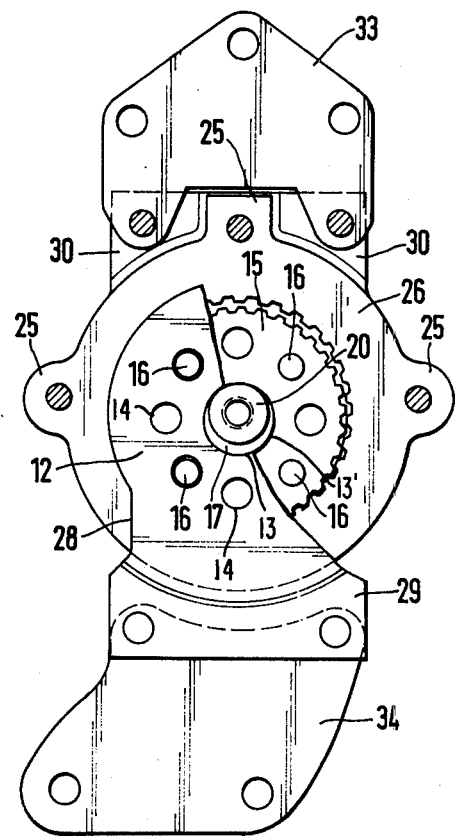
FIG. 3 is a view similar to FIG. 1 but with one of the shell halves removed and another partially broken away.

The additional shell halves 21 which partially constitute the hinge element 10, as well as the shell halves 12 which partially constitute the other hinge element 11, terminate a short distance beyond the outer periphery of the internal gear 26 and are provided, at their terminal or end regions, with offset portions 29 or 30 so that, on the one hand, the shell halves 12 and, on the other hand, the additional shell halves 21, have such a distance from one another at this region that mounting plates 31 and 32 or 33 and 34 can be introduced into the free space between the respective shell halves 12 or 21 and can be connected thereto, for instance, by means of rivets which pass through holes provided in the mounting plates 31 and 32 or 33 and 34 and in the respective shell halves 12 or 21. As can be ascertained from FIGS. 1 and 3, the mounting plates 31 and 32 or 33 and 34 can be of different configurations so that they can be coordinated to the respective construction of the seat, while the hinge proper which includes the adjusting and holding arrangement can always remain the same. While the mounting plates 31 and 32 which are illustrated in FIG. 1 have relatively extensive mounting lengths, the mounting plates 33 and 34 illustrated in FIG. 3 are substantially shorter.

The cylindrical portion 20 of the eccentric bolt 18 is prolonged with respect to the cylindrical portion 19 of the eccentric bolt 18 and has at its outer end a non-circular cross section obtained, for instance, by providing flat surfaces thereon. This prolonged end portion serves the purpose of mounting an entraining member 35 thereon, which can be coupled or connected with a handle 36 which is illustrated as being a handwheel. The eccentric bolt 18 is formed, at its axial side which has the cylindrical portion 19, with a non-circular hole 37 which is coaxial with the cylindrical portion 19, the non-circular bore 37 serving to receive a non-circular end portion of a connecting rod by means of which the turning movement of the eccentric bolt 19 is transmitted to another hinge of a construction similar to that discussed above which is arranged at the other side of the seat.

As may be seen from the drawing, and particularly from FIG. 2, the shell halves 12 and 21 are arranged and mounted on the respective pivot portions or zones 17, 19 and 20 of the eccentric bolt 18 symmetrically with respect to the central plane of meshing of the internal and external gears 15 and 26, as a result of which all forces which are transmitted to and act on the gears 15 and 26 will act symmetrically to the central plane of the meshing gears 15 and 26 so that the gears are not subjected to any forces or moments which would tend to deviate these gears 15 or 26 from the central meshing plane thereof. As a result of this, the wear of the teeth of the gears 15 and 26 is kept to a minimum, particularly in view of the fact that the teeth of the gears 15 and 26 will be in a line contact with one another when meshing, rather than in point contact which would result if one of the gears 15 and 16 were subjected to assymmetrically acting forces. Also, the forces acting on the eccentric bolt 18 are symmetrical, whereby the bending forces acting thereon and the extent of bending of the eccentric bolt 18 are minimized.

It will be understood that each of the elements described above, or two or more together, may also find a useful application in other types of constructions differing from the types described above.

While the invention has been illustrated and described as embodied in a hinge for use in a vehicle seat, it is not intended to be limited to the details shown, since various modifications and structural changes may be made without departing in any way from the spirit of the present invention. So, it is possible and contemplated by the present invention, for instance, to utilize a cylindrical bolt instead of the eccentric bolt 18, and to provide an eccentric ring at one side which would then be supported on the cylindrical bolt by a sleeve and which would, in turn, be connected with the internal gear 26. It is to be understood that, should such an eccentric ring be used, the handle 36 would have to be connected with the sleeve of the eccentric ring. It is further contemplated by the present invention to use a welded connection instead of the connection of the mounting plates 31 to 34 by rivets as illustrated particularly in FIGS. 1 and 3. When welding procedures are to be used, the offset end portions 29 and 30 are then so offset as to be located next to one another and contact each other so that the mounting plates 31 to 34 can be connected to these offset portions 29 and 30 in a single butt welding operation. It is also to be understood that the illustrated hinge can be also used in a position rotated through 180° so that the shell halves 12 are connected to the mounting plate 31 or 33 which is connected to the rear component of the seat and the additional shell halves 21 are connected with the mounting plate 32 or 34 which is affixed to the seat component of the seat.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge for use in a seat, particularly in a motor vehicle seat, for mounting a back component on a seat component of the seat for angular adjustment relative thereto, comprising, in combination, a rotatable pivot element having a first cylindrical zone centered on a pivot axis and a second cylindrical zone centered on an eccentric axis parallel to and offset from said pivot axis; a first hinge element mounted on one of said zones and having a first gear portion and a first symmetrically bifurcated portion which is rigid with and partially embraces said first gear portion; a second hinge element mounted on the other of said zones and including a second gear portion meshing with said first gear portion, and a second symmetrically bifurcated portion which is rigid with said second gear portion and partially embraces the same and said first bifurcated portion; and means for turning said pivot element about said pivot axis to thereby displace said hinge elements relative to one another with said gear portions partially in mesh.

2. A hinge as defined in claim 1, wherein said first gear portion is an external gear annulus; wherein said second gear portion is an internal gear annulus having a crest circle diameter larger by at least one tooth height than the root circle diameter of said first gear annulus; and wherein said eccentric axis is offset from said pivot axis by a distance substantially corresponding to the difference between the radius of the root circle of said internal gear annulus and the radius of the crest circle of the external gear annulus.

3. A hinge as defined in claim 1, wherein said first bifurcated portion includes a first pair of support members which partially confine said first gear portion between themselves; and wherein said second bifurcated portion includes a second pair of support members which partially confine said second gear portion and said first support members between themselves.

4. A hinge as defined in claim 3, wherein said first and second support members are configurated as first and second complementary shell halves, respectively.

5. A hinge as defined in claim 4, wherein said first and second shell halves have first and second abutment surfaces, respectively; and wherein said first abutment surfaces are located closer to one another than said second abutment surfaces as considered in the direction of displacement of said hinge elements relative to one another to permit said hinge elements to be displaced with respect to each other within a limited range before respective ones of said first and second abutment surfaces abut each other.

6. A hinge as defined in claim 4, wherein said first gear portion is a discrete gear member having external teeth; and further comprising means for connecting said gear member to said first shell halves, including at least one axial projection on at least one of said gear member and first shell halves, and at least one axial recess in at least another of said first shell halves and gear member and receiving said axial projection.

7. A hinge as defined in claim 4, wherein said second gear portion is an internal gear annulus; and further comprising means for connecting said second shell halves, including attaching eyelets at the periphery of said internal gear annulus, and attaching members accommodated in said attaching eyelets and connected to said second shell halves.

8. A hinge as defined in claim 4, wherein said first gear portion is a discrete gear member having an external gear annulus, which is affixed to said first shell halves and is mounted on said second zone; wherein said second gear portion includes a gear annulus affixed to said second shell halves; and wherein said second shell halves mount said internal gear annulus on said first zone which includes two cylindrical portions located to axially opposite sides of and axially adjacent said second zone.

9. A hinge as defined in claim 8; wherein said second shell halves have substantially semicircular configurations; wherein said second shell halves have centrally situated support eyelets; and further comprising bearing sleeves received in said support eyelets and mounting said respective cylindrical portions of said first zone.

10. A hinge as defined in claim 4, wherein said first gear portion is a discrete gear member having external teeth; and further comprising means for connecting said gear member to said first shell halves, including a plurality of axial projections located on axial faces of said gear member, and a plurality of axial holes in said shell halves which respectively receive said axial projections of said gear member.

11. A hinge as defined in claim 10, wherein said plurality of axial projections includes at least two of said axial projections of each of said axial faces of said gear member, and said plurality of axial holes including at least two of said axial holes in each of said first shell halves.

12. A hinge as defined in claim 11, wherein said axial projections of each of said axial faces of said gear member are located and uniformly angularly distributed on a circle; and wherein said axial holes of each of said first shell halves are located and uniformly distributed along said circle.

13. A hinge as defined in claim 10, wherein the number of said axial holes in each of said first shell halves is at least twice larger than the number of said axial projections on the corresponding axial face of said gear member.

14. A hinge as defined in claim 4, wherein said first and second shell halves terminate radially outwardly adjacent the periphery of said second gear portion; and wherein each of said first and second hinge elements further includes a mounting member adapted to be connected to one of the components of the seat and rigidly connected to said first and second shell sections, respectively.

15. A hinge as defined in claim 14, wherein said first and second shell sections have connecting portions which extend radially outwardly beyond the periphery of said second gear portion; and wherein the respective one of said mounting members is received between said connecting portions of the respective ones of said first and second shell halves.

16. A hinge as defined in claim 15, wherein said first and second shell sections have respective main portions which extend along respective general planes; and wherein said end portions of said first and second shell sections are respectively offset in the axial direction from the respective general planes.

* * * * *